US008996728B2

(12) United States Patent
Cochinwala et al.

(10) Patent No.: US 8,996,728 B2
(45) Date of Patent: Mar. 31, 2015

(54) OBFUSCATING NETWORK TRAFFIC FROM PREVIOUSLY COLLECTED NETWORK TRAFFIC

(75) Inventors: Munir Cochinwala, Basking Ridge, NJ (US); Marc Pucci, Bridgewater, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 464 days.

(21) Appl. No.: 12/895,973

(22) Filed: Oct. 1, 2010

(65) Prior Publication Data

US 2012/0084464 A1     Apr. 5, 2012

(51) Int. Cl.
  *G06F 15/16*      (2006.01)
  *G06F 15/173*     (2006.01)
  *H04L 12/26*      (2006.01)

(52) U.S. Cl.
  CPC .............. *H04L 43/026* (2013.01); *H04L 43/18* (2013.01); *H04L 43/50* (2013.01)
  USPC .......................................... 709/246; 709/223

(58) Field of Classification Search
  CPC ............ H04L 2209/04; H04L 2209/08; H04L 2209/16
  USPC ................................. 709/246, 223
  See application file for complete search history.

(56) References Cited

U.S. PATENT DOCUMENTS

| | | | |
|---|---|---|---|
| 6,826,684 B1* | 11/2004 | Fink et al. ...................... | 713/160 |
| 7,292,531 B1* | 11/2007 | Hill ............................. | 370/230.1 |
| 7,664,048 B1* | 2/2010 | Yung et al. ..................... | 370/253 |
| 7,949,755 B2* | 5/2011 | Katoh et al. ................... | 709/226 |
| 2005/0108617 A1* | 5/2005 | Lappin .......................... | 714/781 |
| 2006/0041653 A1* | 2/2006 | Aaron ........................... | 709/223 |
| 2006/0090007 A1* | 4/2006 | Tonouchi ....................... | 709/245 |
| 2008/0104416 A1* | 5/2008 | Challener et al. .............. | 713/189 |
| 2008/0235336 A1* | 9/2008 | Stern et al. .................... | 709/206 |
| 2011/0010608 A1* | 1/2011 | Kim et al. ...................... | 714/776 |
| 2011/0103394 A1* | 5/2011 | Vogt et al. ..................... | 370/401 |
| 2011/0161657 A1* | 6/2011 | So ............................... | 713/153 |

OTHER PUBLICATIONS

James Hutchins and Randall Simons, "Enhanced Internet Firewall Design Using Stateful Filters Final Report" (Sandia National Laboratories, Aug. 1997) (7, 14).*

Nord, M.; Bjornstad, S.; Nielsen, M.L., "Demonstration of optical packet switching scheme for header-payload separation and class-based forwarding," Optical Fiber Communication Conference, 2004. OFC 2004 , vol. 1, no., pp. 563,, Feb. 23-27, 2004.*

(Continued)

*Primary Examiner* — Taylor Elfervig

(57) ABSTRACT

An obfuscated network traffic server is operative to generate obfuscated network traffic. The obfuscated network traffic server maintains the relationship between extracted application content and extracted network header content such that the obfuscated network traffic is indistinguishable from the monitored network traffic. The obfuscated network traffic server may include a network monitor operative to monitor network traffic and to extract application content and network header content from the monitored network traffic. The obfuscated network traffic server may also include a data masking processor operative to mask a portion of the separated application content and/or the separated network header content. The obfuscated network traffic server may further include a masking attribute selector operative to specify the attributes of the application content and/or the network header content that is to be masked.

20 Claims, 7 Drawing Sheets

(56) References Cited

OTHER PUBLICATIONS

Kashyap, A.; Rawat, A.; Shayman, M., "WSN18-4: Integrated Backup Topology Control and Routing of Obscured Traffic in Hybrid RF/FSO Networks," Global Telecommunications Conference, 2006. GLOBECOM '06. IEEE, vol., no., pp. 1,6, Nov. 27, 2006-Dec. 1, 2006.*

Lallas, E.; Skarmoutsos, N.; Syvridis, D., "A New All Optical Label Swapping Method Based on Optical FSK Header Encoding on the Intensity Modulated Payload," Optical Communication, 2002. ECOC 2002. 28th European Conference on, vol. 3, no., pp. 1,2, Sep. 8-12, 2002.*

Bintjas, C.; Pleros, N.; Yiannopoulos, K.; Theophilopoulos, G.; Kalyvas, M.; Avramopoulos, H.; Guekos, G., "All-optical packet address and payload separation," Photonics Technology Letters, IEEE, vol. 14, No. 12, pp. 1728,1730, Dec. 2002.*

* cited by examiner

OBFUSCATING NETWORK TRAFFIC FROM PREVIOUSLY COLLECTED NETWORK TRAFFIC

BACKGROUND

Network traffic used in network simulations or other monitored interconnection of computers, such as "honeypots," are generally derived from limited network traces or based on simple rules for statistically generating traffic. In addition, the network traffic used in these network simulations or honeypots may be limited only to a single network stack. These network simulations and honeypots typically focus on isolated network sessions and do not monitor or record network and application behavior.

Moreover, these network simulations and honeypots typically mask portions of the network traffic to prevent the disclosure of a user's identity, but the masking scheme used in these network simulations and honeypots are generally unsophisticated. The masking scheme used in these network simulations and honeypots generally do not account for the tracking of multiple network sessions across multiple dimensions, such as time or user accounts.

Furthermore, in populating the network simulations and honeypots with network traffic, the network simulations and honeypots typically rely on mathematical models of network traffic. However, because computer analysts have, developed advanced techniques for detecting whether generated network traffic is based on these mathematical models, these types of network simulations and honeypots are generally insufficient for use in developing defensive systems to protect against modern intrusions and attacks. Moreover, the most recent generation of sophisticated and automated analysis systems, such as inter-connected automated computer systems that leverage distributed computing resources, known as "botnets," are designed to detect artificial environments, especially those based on mathematical models of generated network traffic and statistical variation. Because these botnets are able to detect artificial environments of network traffic, the botnets alter their behavior to avoid detection.

BRIEF SUMMARY

A system for generating obfuscated network traffic is provided. In one aspect, the system includes a computer-readable storage device having multiple databases, a data masking processor, and an obfuscated network traffic request interface.

The databases included in the computer-readable storage device include an application content database operative to store application content extracted from a first network traffic flow by network monitor, a network header content database operative to store the network header content extracted from the first network traffic flow by the network monitor, and an obfuscated network traffic database operative to store obfuscated network header content. Network application content may include raw data or application content such as one or more parts of an image file, a video file, a document file or any other kind of electronic content.

The data masking processor is operative to retrieve the network header content stored in the network header content database and mask at least a selected portion of the network header content to generate the obfuscated network header content. The obfuscated network traffic request interface is operative to receive a request for obfuscated network traffic and transmit the obfuscated network header content stored in the obfuscated network traffic database based upon the request for obfuscated network traffic.

In another aspect, the system includes a masking attribute selector operative to receive an input specifying one or more network header attributes to be masked, wherein the data masking processor is further operative to mask the selected portion of the network header based on the input received by the masking attribute selector.

In a further aspect, the system includes a replacement application content database operative to store replacement application content, wherein at least a portion of the application content extracted by the network monitor is replaced with the replacement application content stored in the replacement application content database.

In yet another aspect, the application content is identified as being sensitive application content not intended to be viewed by a recipient other than the recipient identified in the network header content, and the application content is replaced with replacement application content having similar characteristics as the identified application content.

In yet a further aspect, the system includes multiple flows of network traffic, such as a first network traffic flow and a second network traffic flow. The network monitor may be further operative to identify the first and second network traffic flows, and to also separate the application content and network header content from the second network traffic flow. Moreover, the second network traffic flow may be of a different network traffic flow type different from the network traffic flow type of the first network traffic flow. For example, in one aspect, the first network traffic flow includes the File Transfer Protocol ("FTP") and the second network traffic flow includes the Hypertext Transfer Protocol ("HTTP").

In another aspect, the first network flow may be identified based on a destination port specified in the network header content. Moreover, the application content and the network header content may be separated based on a network traffic type of the first network traffic flow.

In a further aspect, the system includes a network traffic flow multiplexer. The network traffic flow multiplexer may be operative to receive obfuscated network header content from the data masking processor and request application content from the application content database based on a network application type identified in the obfuscated network header content. Moreover, the network traffic flow multiplexer may be further operative to reconstruct an obfuscated network traffic flow comprising the requested obfuscated network header content and the requested application content, and store the obfuscated network traffic flow in the obfuscated network traffic database.

In yet another aspect, the network traffic flow multiplexer may be further operative to replace the obfuscated network traffic header content stored in the obfuscated network traffic database and included in the obfuscated network traffic flow with the reconstructed obfuscated network traffic flow.

In yet a further aspect, the obfuscated network traffic database is segmented according to an obfuscated network traffic database schema. The obfuscated network traffic database schema may include multiple segments, such as an Internet Protocol ("IP") packet segment specifying IP packet attributes for the obfuscated network header content and a request and response segment specifying request and response attributes for the obfuscated network header content. The obfuscated network traffic database schema may also include a time segment specifying time attributes for the obfuscated network header content and a server segment specifying server attributes for the obfuscated network header content. In addition, the obfuscated network traffic database schema may include a customer segment specifying customer attributes for the obfuscated network header content, and a Uniform Resource Locator ("URL") segment specifying URL attributes for the obfuscated network header content.

A method for implementing the above-described system is also provided. In addition, a computer-readable medium may have instructions stored thereon that, when executed by a computer processor, cause a computer system to generate obfuscated network traffic.

DETAILED DESCRIPTION

Figure 1:
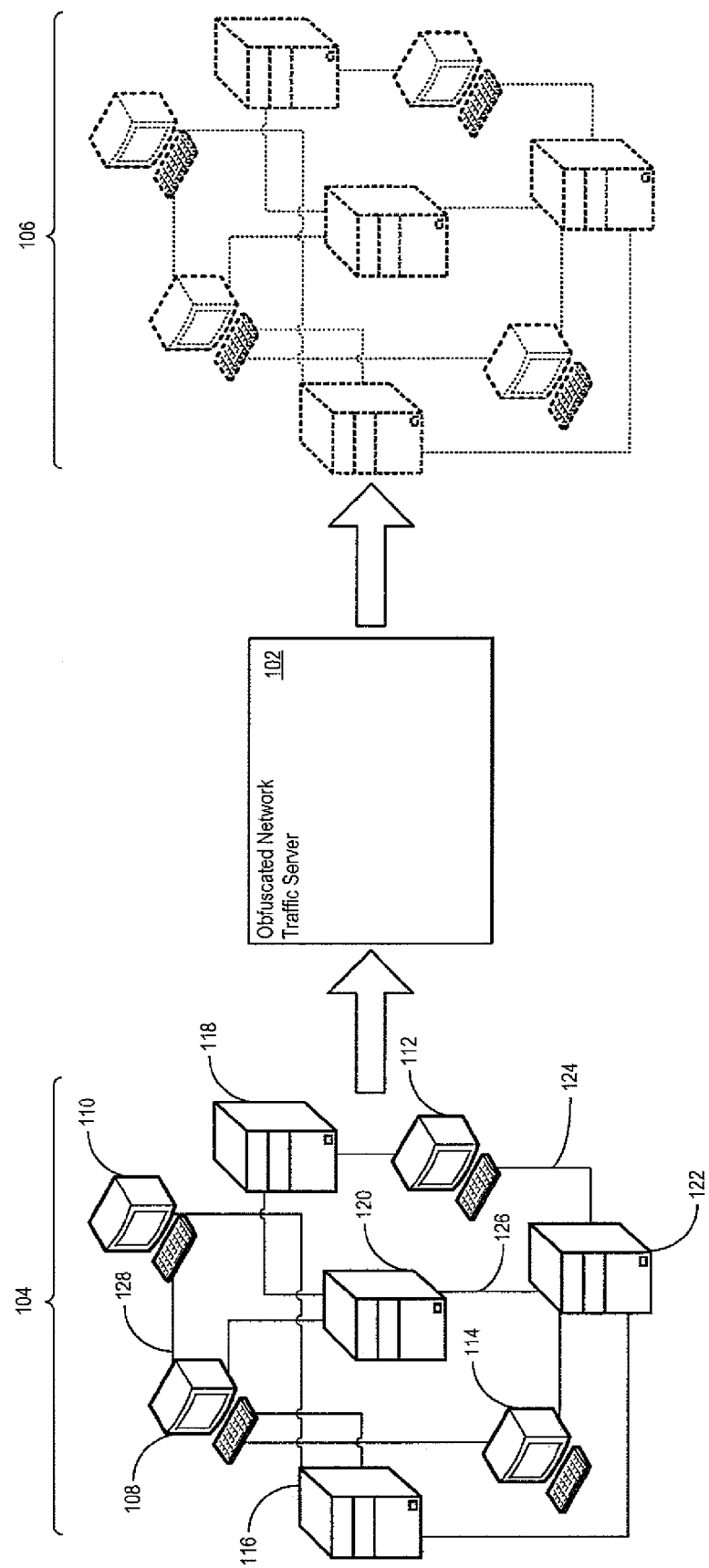
FIG. 1 illustrates an example of an obfuscated network traffic server configured to obfuscate network traffic.

FIG. 1 shows one example of an obfuscated network traffic server 102 configured to obfuscate network traffic. The obfuscated network traffic server 102 may be monitoring one or more network traffic flows of a physical network 104 to generate the network content for a virtual, obfuscated network 106.

The physical network 104 may include one or more network nodes 108-122. The network nodes may include client network nodes 108-114 and server network nodes 116-122. The client network nodes 108-114 may be operative to request and receive content from the server network nodes 108-114. The server network nodes 108-114 may be operative to provide content to the client network nodes 108-114. Examples of content requested by the client network nodes 108-114 and provided by the server network nodes 116-112 include electronic files, streaming audio, streaming video, Internet web pages, or any other electronic content now known or later developed.

The network traffic flow of the physical network 104 may include client-server network traffic flows 124 where network traffic travels between a client network node 112 and a server network node 122. Moreover, the network traffic between the client network node 112 and the server network node 122 may travel through any number of intervening network nodes, such as the client network node 108, the server network node 116, or any combination of client network nodes and server network nodes.

In addition, the client-server network traffic flows 124 may include different types of network traffic flows. The network traffic flow types may be for sharing electronic files, video communications, audio communications, publishing electronic documents, or any other network traffic flow type now known or later developed. Examples of network traffic flow types that may be found in the client-server network traffic flows 124 are network traffic flows using the Hypertext Transfer Protocol ("HTTP"), the File Transfer Protocol ("FTP"), the Secure Shell protocol ("SSH"), the Session Initiation Protocol ("SIP"), or any other protocol now known or later developed.

Moreover, the network traffic flows may include network traffic that travels between client network nodes on a network. For example, the physical network 104 may include a first client network node 108 in communication with a second client network node 110. A client-client network traffic flow 128 may include network traffic that flows between the first client network node 108 and the second client network node 110. Any intervening number or types of network nodes may be between the first client network node 108 and the second client network node 110. An example of a network traffic flow type that may be communicated between the first client network node 108 and the second client network node 110 is a network traffic flow type for audiovisual communications, such as the Skype protocol, developed by Skype Technologies, S.A., located in Luxembourg. However, the first client network node 108 and the second client network node 110 may also communicate using alternative types of protocols, such as HTTP, FTP, SSH, SIP, or any other protocol now known or later developed. Moreover, either the first client network node 108 or the client network node 110 may be configured as a server network node.

In addition, the network traffic flows of the physical network 104 may include network traffic that travels between a first server network node 120 and a second server network node 122. A server-server network traffic flow 126 may include network traffic that flows between the first server network node 120 and the second server network node 122. Any intervening number or types of network nodes may be between the first server network node 120 and the second server network node 122. An example of a network traffic flow type that may be communicated between the first server network node 120 and the second server network node 122 is a network traffic flow type for configuring dynamically assigned Internet Protocol ("IP") address, such as the Dynamic Host Configuration Protocol ("HCP"). Another example of a network traffic flow type that may be communicated between the first server network node 120 and the second server network node 122 is a network traffic flow type for electronic file transfers, such as the File Exchange Protocol ("FXP"). However, the first server network node 120 and the second server network node 122 may also communicate using alternative types of protocols, such as HTTP, FTP, SSH, SIP, or any other protocol now known or later developed. Moreover, either of the first server network node 120 or the second server network node 122 may be configured as a client network node.

The obfuscated network traffic server 102 is operative to monitor the network traffic flows of the physical network 104. The obfuscated network traffic server 102 may monitor the client-client network traffic flows 128, the client-server network traffic flows 124, the server-server network traffic flows 126, or combinations thereof. By monitoring the network traffic flows, the obfuscated network traffic server 102 may be further operative to reproduce a mimicked network 106 having a similar topology as the physical network 104. The obfuscated network traffic server 102 may construct the mimicked network 106 as having a similar topology as the physical network 104. The mimicked network 106 may then be reconstituted as a physical network or as a virtual network implemented using computer virtualization techniques.

In addition, the obfuscated network traffic server 102 is operative to monitor and maintain a timeline of the communication sessions occurring in the physical network 104. The network traffic flows of the physical network 104 may include one or more communication sessions between any of the client network nodes 108-114, between any of the client server network nodes 116-122, or between any of the client network nodes 108-114 and the server network nodes 116-122. In general, a communication session may involve one or more network messages passed between two or more network nodes. For example, a communication session between the client network node 108 and the server network node 122 may include multiple network messages in one or more network traffic flows using such communication protocols as FTP, HTTP, or other communication protocols. In addition, a communication session may include unidirectional communication or bidirectional communication. For example, the client network node 108 may transmit one or more network messages to the server network node 122 and the server network node 122 may transmit one or more network messages to the client network node 108.

Furthermore, a communication session may be stateful or stateless. For example, a stateful communication session may be a communication session where at least one of the network nodes in the communication session retains state information about the communication session. An example of a stateful communication session is a communication session where the network traffic flow includes the use of the Transport Control Protocol ("TCP") as the Transport Layer of the network traffic flow. In contrast to a stateful communication session, a stateless communication session may be a communication where none of the network nodes in the communication session retain state information about the communication session.

The obfuscated network traffic server 102 may be operative to monitor and maintain a timeline of the stateful communication sessions, the stateless communication sessions, or combinations thereof. As an example, consider a scenario where a first client network node 108 establishes a first communication session with a first server network node 122. This first communication session may involve the first client network node 108 visiting a website whose content is stored on the first server network node 122. The first client network node 108 may then initiate a second communication session with a second client network node 112, which may then initiate a third communication session with a third client network node 114. Based on the second communication session between the first client network node 108 and the second client network node 112, the third client network node 114 may learn of the website from the second client network node 112. The third client network node 114 may then establish a fourth communication session with the first server network node 122 storing the contents of the website previously requested by the first client network node 108. Throughout this scenario, the obfuscated network traffic server 102 may be operative to monitor and maintain a timeline of each of the communication sessions between the various client network nodes 108/112/114 and the first server network node 122.

In monitoring the communication sessions, the obfuscated network traffic server 102 may monitor the network traffic flows for each of the communication sessions and when each of the network traffic flows occurred during each of the communication sessions. By monitoring and maintaining a timeline of the network traffic flows and communication sessions of the physical network 104, the obfuscated network traffic server 102 may reproduce network traffic flows for the mimicked network 106 that appear indistinguishable from the network traffic flows of the physical network 104. The network traffic flows of the mimicked network 106 may appear indistinguishable from the network traffic flows of the physical network 104 both in content and when the network traffic flow occurred.

The obfuscated network traffic server 102 may also be operative to reproduce the network traffic for topic-based communications of one or more social communication networks. In one example, the obfuscated network traffic server 102 may reproduce or obfuscate the network communications between multiple parties of a communication network. In this example, the obfuscated network traffic server 102 may obfuscate the network traffic between multiple parties, such as communications between Able, Baker, Charlie, and Doug. The obfuscated network traffic server 102 may preserve the organization of the communications between these four parties, such as which communications were transmitted between which parties (e.g., a communication between Able and Baker that was subsequently forwarded to Charlie and then Doug).

Moreover, the obfuscated network traffic server 102 may reproduce or obfuscate the network communications between multiple parties of multiple networks. Using the parties discussed above, consider a scenario of reproducing obfuscated network traffic for an email chain across multiple networks. It is possible that, in this scenario, multiple emails between Able, Baker, Charlie, and Doug could be handled by a mail server that does not identify the timeline of the communications. In this example, the obfuscated network traffic server 102 may perform comparison analysis on the emails to compare various attributes of the emails to preserve the communication integrity of the emails. For example, the obfuscated network traffic server 102 may analyze an email identifier, a subject, timestamps, or any other attributes to determine and preserve the communication timeline of the emails. Moreover, the obfuscated network traffic server 102 may reproduce or obfuscate a set of network communications for a defined time interval. To further highlight the analysis complexities of the obfuscated network traffic server 102, where Charlie from the example above receives an email, and then subsequently replies to all recipients (Able, Baker, Dough, and/or alternative recipients) of the email, then the obfuscated network traffic server 102 may preserve the recipient relationships through consistent replacement in the obfuscated network traffic.

Figure 2:
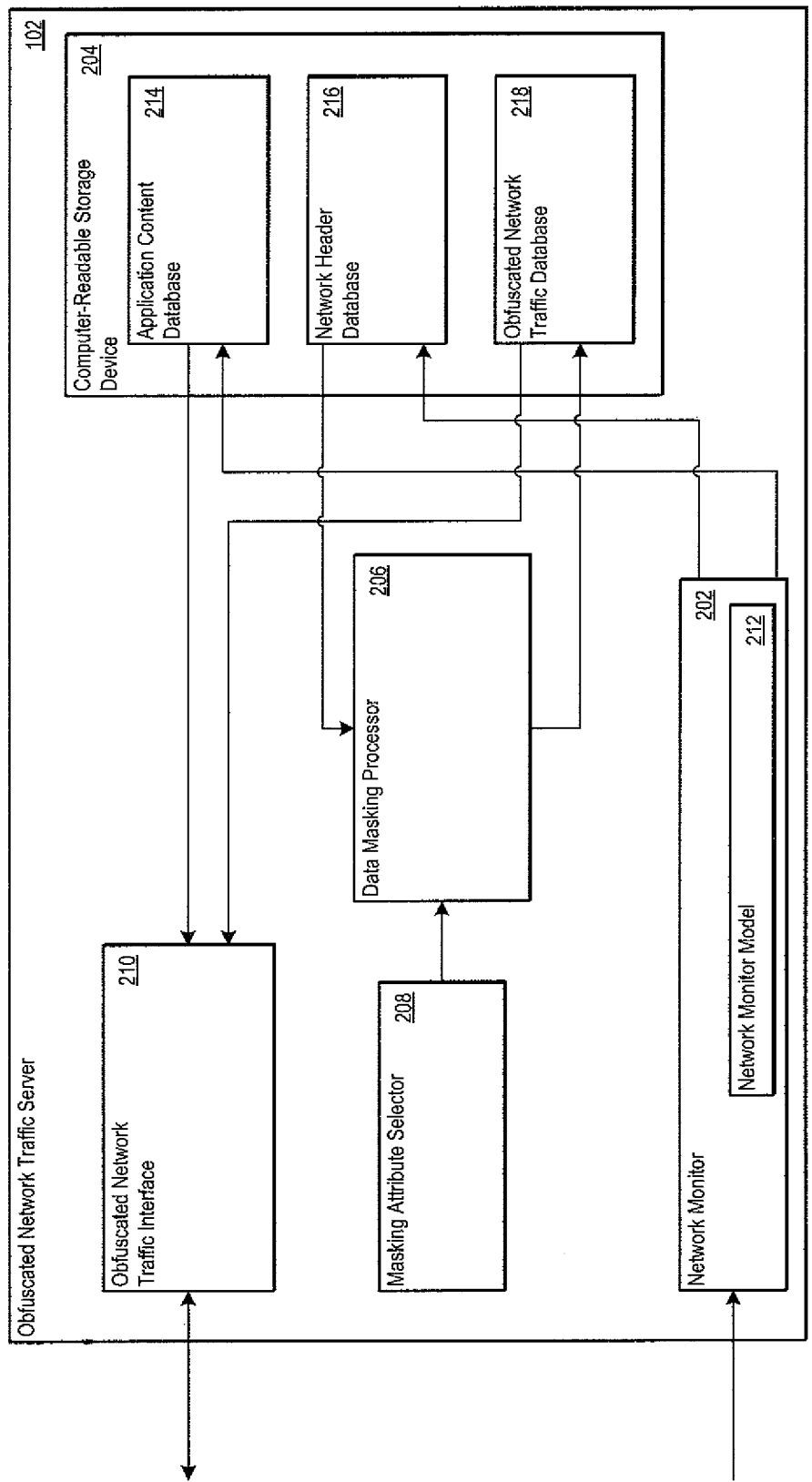
FIG. 2 illustrates an example of an obfuscated network traffic server.

FIG. 2 illustrates an example of the obfuscated network traffic server 102. The obfuscated network traffic server 102 may include several components, including a network monitor 202, a computer-readable storage device 204, a data masking processor 206, a masking attribute selector 208, and an obfuscated network traffic interface 210. Alternative, or additional, components of the obfuscated network traffic server 102 are discussed with reference to FIGS. 3 and 4.

With reference to FIGS. 1 and 2, the network monitor 202 is operative to monitor one or more of the network traffic flows of the physical network 104. To monitor the network traffic flows, the network monitor 202 may be configured with a network model 212 that may identify the types of network traffic flows to monitor and how to handle a message extracted from an identified network traffic flow. In addition, the network model 212 may describe how the network monitor 202 is to parse the messages contained within a monitored network traffic flow.

In one implementation, the messages of the network traffic flows conform to a network standard. For example, the messages of the network traffic flows may conform to the Open System Interconnection Reference Model ("OSI Model"), where a message of a network traffic flow may be divided into five layers: a network layer, transport layer, a session layer, a presentation layer, and an application layer. Alternatively, the messages of the network traffic flows may conform to the TCP/IP Model, where a message of a network traffic flow may be divided into three layers: an Internet layer, a transport layer, and an application layer. As is known in the art, the use of communication and application protocols vary according to layer.

For example, with the OSI Model, the IP may be used in the network layer; TCP, User Datagram Protocol ("UDP"), or other protocol, may be used in the transport layer; the Network Basic Input/Output System ("NetBIOS") Protocol or other protocol may be used in the session layer; the Multipurpose Internet Mail Extensions ("MIME") Protocol or other protocol may be used in the presentation layer; and several different types of protocols may be used in the application layer, such as HTTP, SIP, Network News Transfer Protocol ("NNTP") or other protocol.

Similarly, with the TCP/IP Model, IP, the Internet Control Message Protocol ("ICMP"), or other protocol may be used in the Internet layer; TCP, UDP, or other protocol may be used in the transport layer, and several different types of protocols may be used in the application layer, such as HTTP, NNTP, SIP, the Simple Object Access Protocol ("SOAP").

Referring back to the network model 212, the network model 212 may describe that the content of the messages of the network traffic flows are to be divided into two or more groups of content based on the layers of the message. The network model 212 may define a first group of network content that includes the network level layers of a message. For example, where the OSI Model is specified, the first group of network content may include the network layer, the transport layer, the session layer, and the presentation layer. Similarly, where the TCP/IP Model is specified, the first group of network content may include the Internet layer and the transport layer. In this first group of network content, the network monitor 202 may separate out the network header content for each layer of a message contained within a network traffic flow. For example, when the network monitor 202 receives a message, the network monitor 202 may extract the IP header from the Internet layer and the TCP header from the transport layer. As explained below, the network monitor 202 may then store the extracted network header content in one or more databases of the computer-readable storage device 204.

The second group of content that the network model 212 may define is a group of application content. The network model 212 may define that the group of application content includes the content of an application layer of a message. As examples, the type of content included in this group may include HTTP content, SIP content, FTP content, or any other type of application content. Thus, when the network monitor 202 receives a message, the network monitor 202 may extract the application content from a message and then store the extracted application content in one or more databases of the computer-readable storage device 204.

Moreover, the network monitor 202 may handle the application content of network traffic flows differently according to the specification established in the network model 212. For example, the network model 212 may specify that the network monitor 202 is to extract the network header content and application content from messages in a network traffic flows having FTP content. Additionally, the network model 212 may specify that the network monitor 202 is to ignore messages from a network traffic flow having HTTP content.

Moreover, the network model 212 may specify additional network traffic characteristics that the network monitor 202 is to record. For example, with regard to a network traffic flow having FTP content, the network model 212 may specify that the network monitor 202 is to record the name, size and transfer rate of the application content contained in the network traffic flow. As another example, with regard to a network traffic flow having HTTP content, the network model 212 may specify that the network monitor 202 is to record the number and type of Internet objects contained in each webpage of the HTTP content. The network monitor 202 may flush the results of monitoring the network traffic flows to flat files before the various parts of the network traffic flows are transmitted to one or more databases.

To identify different types of messages and network traffic flows, the network model 212 may define that the network monitor 212 is to identify a network traffic type according to a destination port specified in one or more layers of a message in a network traffic flow. For example, the network model 212 may define that the network monitor 202 is to identify HTTP content when the TCP header in the transport layer of a message specifies a destination port of "80." As another example, the network model 212 may define that the network monitor 202 is to identify FTP content when the TCP header in the transport layer of a message specifies a destination port of "21." The network model 212 may further define other types of content.

As mentioned previously, the network monitor 202 is operative to store the extracted network header content and the application content in one or more databases of the computer-readable storage device 204. Accordingly, the computer-readable storage device 204 includes several databases for storing the extracted network header content and application content. In one implementation, the computer-readable storage device 204 includes an application content database 214 operative to store the extracted application content and a network header content database 216 operative to store the extracted network header content. In addition, the computer-readable storage device 204 may include an obfuscated network traffic database 218 operative to store obfuscated network header content and/or application content.

When the network monitor 202 stores extracted network header content in the network header database 216, a data masking processor 206 may request the extracted network header content from the network header database 216. The data masking processor 206 may be operative to mask at least a selected portion of the network header content to generate obfuscated network header content. Masking a selected portion of the extracted network header content may include performing a bitwise operation on one or more portions of the network header. Examples of bitwise operations include the bitwise AND operation, the bitwise OR operation, the bitwise XOR operation, and other bitwise operations. As another example, masking may include analyzing the IP addresses in the network header content and changing or replacing the IP addresses with a set of IP addresses. In this example, the replacement IP addresses may have characteristics in common with the replaced IP addresses, such as by being on a common sub-net or other characteristic. In yet a third example, masking may also include the replacement of one or more network priority bits of the network header content with a different, but consistent set of network priority bits. Whichever masking technique is used, after generating the obfuscated network header content, the data masking processor 206 may store the obfuscated network header content in the obfuscated network traffic database 218.

In an alternative implementation, masking may include replacing one or more portions of the network header content requested from the network header database 216. The network header content requested from the network header database 216 may be replaced with randomly generated network header content, with previously determined network header content, or any other type of network header content. Moreover, as explained with reference to FIG. 4, the application content stored in the application content database 214 may be masked (e.g., replaced) with replacement application content.

The data masking processor 206 may mask the selected portion of the network header content (or the application content) according to one or more network attributes selected by the masking attribute selector 208. The masking attribute selector 208 may be operative to receive an input specifying one or more network header attributes to be masked by the data masking processor 206. In addition, the masking attribute selector 208 may be operative to receive an input specifying application content to be masked by the data masking processor 206. The input received by the masking attribute selector 208 may be input from a human operator, another computer component of the obfuscated network traffic server 102, or may be preselected by the masking attribute selector 208.

In addition, the masking attribute selector 208 may be flexibly implemented such that additional attributes may be added that are to be masked by the data masking processor 206. For example, a network administrator, computer component, or other system, may add its own attributes to be masked. For example, when the extracted network header content indicates FTP content, the data masking processor 206 may mask the IP addresses indicated in the network header content, but may maintain the relationship between the network header content and the extracted application content so that network traffic characteristics, such as bursts, are portrayed in a mimicked network.

Examples of attributes that may be selected by the masking attribute selector 208 for masking include any of the header fields found in any of the transport layer protocols, internet layer protocols, application layer protocol, or any other protocol from any other layer. For example, the masking attribute selector 208 may indicate that the data masking processor 206 is to mask the destination address field, source address field, the source port field, the destination port field, the sequence number field, or any other header field of a network message. Moreover, the masking attribute selector 208 may indicate that the header fields for one layer are to be masked while other header fields for another layer are not to be masked. For example, the masking attribute selector 208 may, indicate that one or more header fields of a transport layer protocol, such as TCP, are to be masked whereas one or more header fields of an Internet layer protocol, such as IP, are not to be masked. Other arrangements of selected header fields to be masked and header fields not to be masked are also possible.

In one implementation, the masking attribute selector 208 and/or the data masking processor 206 are implemented using a standard Extract, Transform, and Load ("ETL") tool. The attributes to be masked by the data masking processor 206 may be parameters to the ETL tool for a network traffic flow or may be parameters to the ETL tool for a specific network type of network traffic flow.

The application content database 214 is operative to store the application content extracted by the network monitor 202. An example of application content that may be stored by the application content database 214 is the content found in the application layer of a network message. As discussed previously, the application layer of the network message may correspond to the application layer of the TCP/IP model, the application layer of the OSI model, or the application layer of any other network model. Moreover, the content stored by the application content database 214 may include content from additional layers of a network message, such as the content from the presentation layer and the session layer of the OSI model. In addition, as the network monitor 202 stores the application content in the application content database 214, the network monitor 202 may maintain the relationship between the application content and its corresponding network header content. The relationship between the extracted application content and the extracted network header content may be maintained using a database schema. One example of a database schema is discussed with reference to FIGS. 5 and 6. Other mechanisms for maintaining the relationship between the application content and the extracted network header content are also possible. The database schema shown in FIGS. 5 and 6 may be implemented in the obfuscated network traffic database 218, but may also be implemented in the application content database 214, the network header database 216, or any other database.

The obfuscated network traffic database 218 is operative to store the obfuscated network header content obfuscated (e.g., by masking) by the data masking processor 206. In the implementation shown in FIG. 2, an obfuscated network traffic interface 210 is in communication with the obfuscated network traffic database 218 and the application content database 214. The obfuscated network traffic interface 210 is operative to receive a request for obfuscated network traffic and transmit the obfuscated network header content stored in the obfuscated network traffic database 218 based upon the request for obfuscated network traffic.

In addition, the obfuscated network traffic interface 210 may retrieve application content corresponding to the retrieved obfuscated network header content such that the obfuscated network traffic interface 210 re-creates an obfuscated network message that appears similar to the network message as it was initially received by the network monitor 202. Hence, when the obfuscated network traffic database 218 transmits an obfuscated network message, the behavior and payload of the obfuscated network message does not appear differently than when the network message was received by the network monitor 202. Accordingly, to an observer, the obfuscated network messages found in a mimicked network, such as the mimicked network 106, appear and behave as the network messages appeared in a physical network, such as the physical network 104.

Figure 3:
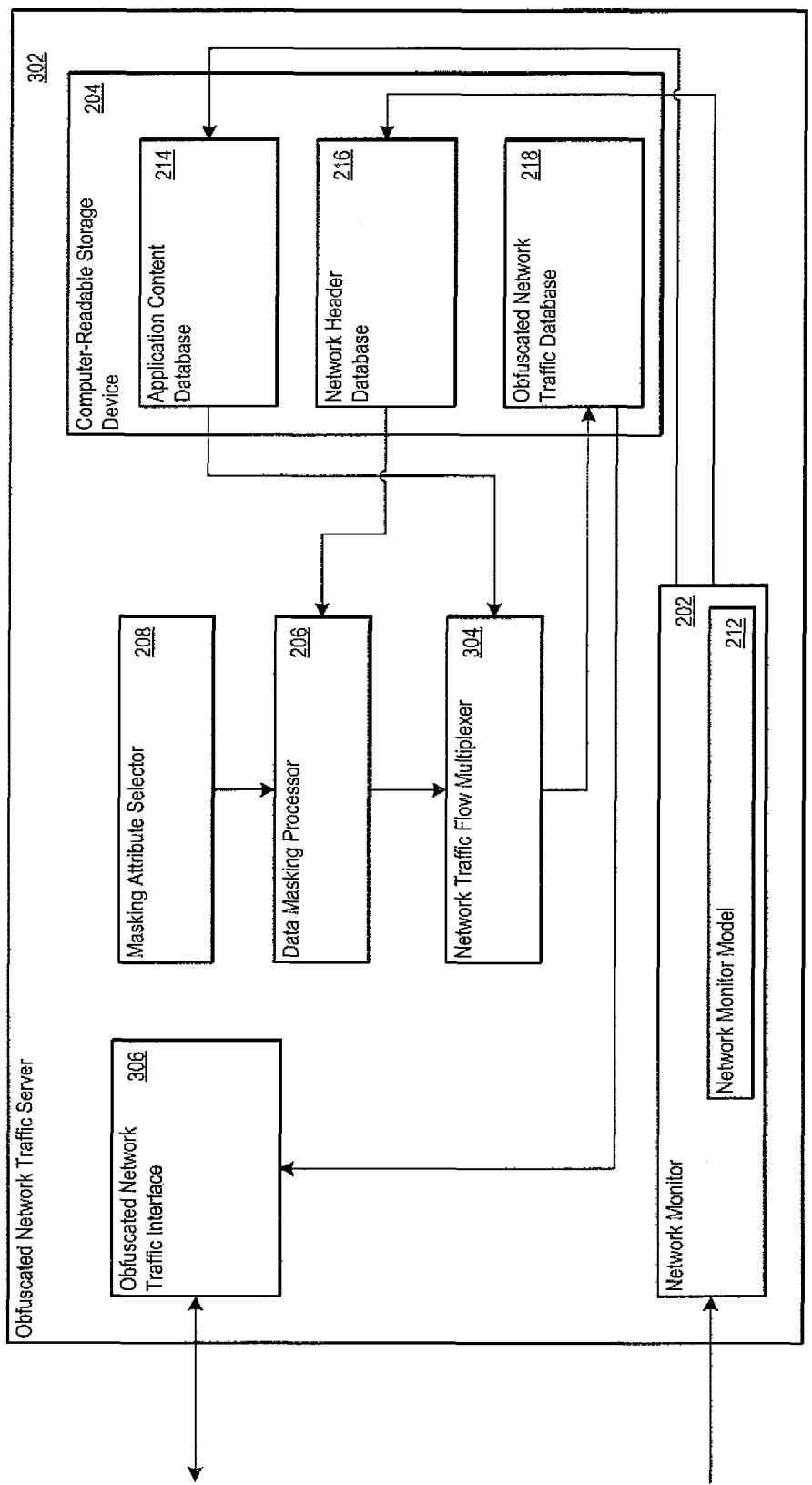
FIG. 3 illustrates an alternative example of an obfuscated network traffic server.

FIG. 3 illustrates an alternative example of an obfuscated network traffic server 302. For brevity, where components are numbered with reference numerals previously discussed, a discussion of those components has been omitted.

The obfuscated network traffic server 302 includes a network traffic flow multiplexer 304. The network traffic flow multiplexer 304 is operative to combine obfuscated network header content with application content to reproduce one or more network messages and/or network traffic flows corresponding to network traffic flows that were monitored by the network monitor 202.

In one implementation, the network traffic flow multiplexer 304 is operative to receive obfuscated network header content from the data masking processor 206. However, the network traffic flow multiplexer 304 may also receive the obfuscated network header content from another network header source, such as the obfuscated network traffic database 218, the network monitor 202, or any other component or system in communication with the obfuscated network traffic server 302. The network traffic flow multiplexer 304 is also operative to request application content from the application content database 214 based on application content identifier. The application content identifier assists the network traffic flow multiplexer 304 in identifying the application content that was previously extracted by the network monitor 202 and facilitates the reconstruction of obfuscated network traffic flows that behave similarly to the network traffic flows monitored by the network monitor 202. As discussed below with reference to FIG. 7, the application content identifier may be a single identifier, such as a packet identifier, a combination of identifiers, or any other type of identifiers.

Using the application content requested from the application content database 214 and the obfuscated network header content, the network traffic flow multiplexer 304 is further operative to reconstruct an obfuscated network traffic flow and/or obfuscated network messaged that includes the obfuscated network header content and the application content. The network traffic flow multiplexer 304 may also be operative to store the obfuscated network traffic flow and/or obfuscated network message in the obfuscated network traffic database 218. For optimization and reducing storage pressure on the computer-readable storage device 204, the network traffic flow multiplexer 304 may replace the requested obfuscated network header content with the obfuscated network traffic flow and/or obfuscated network message. Alternatively, the network traffic flow multiplexer 304 may store the obfuscated network traffic flow and/or obfuscated network message in another database or computer-readable storage device (not shown).

In one implementation, the network traffic flow multiplexer 304 receives the obfuscated network header content directly from the data masking processor 206. Alternatively, the network traffic flow multiplexer 304 may receive the obfuscated network header content from another source, such as the obfuscated network traffic database 218 or any other database in communication with the obfuscated network traffic server 302.

In addition, and working in conjunction with the data masking processor 206, the network traffic flow multiplexer 304 may be operative to mask application content received from the application content database 214 according to one or more attributes selected by the masking attribute selector 208. In one implementation, the application content received from the application content database 214 is obfuscated based on an application content sensitivity attribute established in the masking attribute selector 208.

The application content sensitivity attribute may indicate which types of application content are to be masked by the network traffic flow multiplexer 304 and/or the data masking processor 206. For example, the application content sensitivity attribute may indicate that the network traffic flow multiplexer 304 is to mask application content sent in a secured network message, such as a secured HTTP message, an SSH message, or other type of secured network message. As another example, the application content sensitivity attribute may indicate that the network traffic flow multiplexer 304 is to mask application content sent in an unsecured network message, but where the application content is of an application content type. For example, the sensitive application content may be passwords, usernames, bank account numbers, aliases, electronic images (e.g., .JPG, .GIF, etc.), electronic documents (e.g., .PDF, .DOC, .WPD, etc.) or any other type of sensitive application content that is sent in an unsecured network message. As another example, the application content may be identified as being sensitive when the application content is not intended to be viewed by a recipient other than the recipient identified in the corresponding network header content. Moreover, the application content sensitivity attribute may exclude types of application content from being masked. The exclusion of application content from being masked may apply to unsecured or secured network messages.

The obfuscated network traffic server 302 also includes an obfuscated network traffic interface 306. The obfuscated network traffic interface 306 is in communication with the obfuscated network traffic database 218. In the implementation shown in FIG. 3, the obfuscated network traffic interface 306 receives a request for obfuscated network traffic and retrieves the obfuscated network traffic from the obfuscated network traffic database 218. However, the obfuscated network traffic interface 306 may retrieve the obfuscated network traffic from another source, such as the network traffic flow multiplexer 304 or the data masking processor 206, or a combination of sources.

Figure 4:
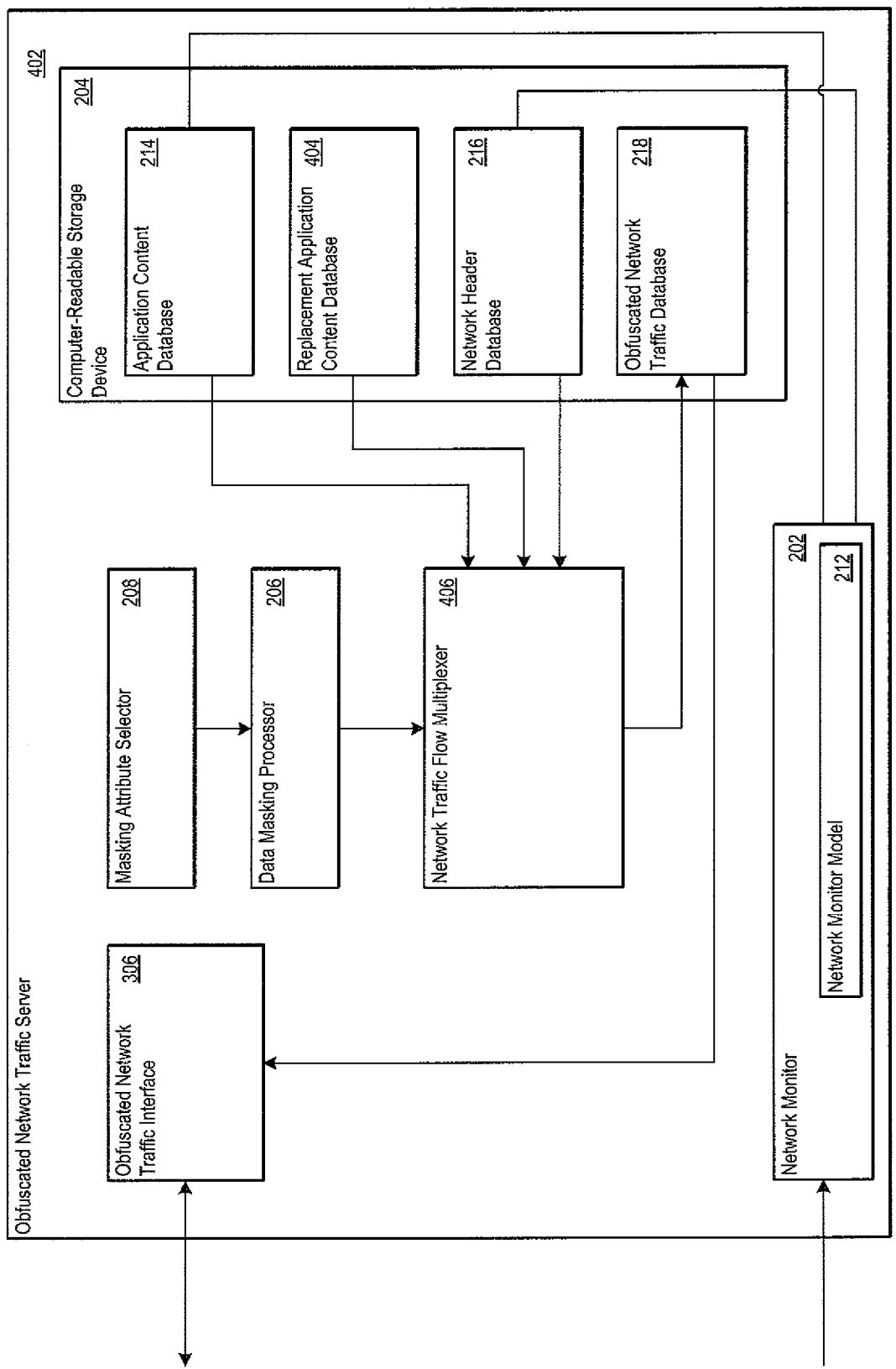
FIG. 4 illustrates yet another example of an obfuscated network traffic server.

FIG. 4 illustrates yet another example of an obfuscated network traffic server 402. For brevity, where components are numbered with reference numerals previously discussed, a discussion of those components has been omitted.

The obfuscated network traffic server 402 includes a replacement application content database 404. The replace application content database 404 includes replacement application content that is to replace application content for an obfuscated network traffic flow and/or obfuscated network message. The replacement application content may be any type of electronic application content, such as electronic documents, electronic images, randomly or pseudo-randomly generated alphanumeric characters, or any other type of electronic application content.

As shown in FIG. 4, a network traffic flow multiplexer 406 is in communication with the application content database 214, the replacement application content database 404, the network header database 216, and the obfuscated network traffic database 218. In one implementation, the network traffic flow multiplexer 406 replaces application content to be merged with replacement application content from the replacement application content database 404. The network traffic flow multiplexer 406 may be operative to identify the type of application content to be replaced and to request and/or retrieve a similar type of application content from the replacement application content database 404. For example, where the network traffic flow multiplexer 406 identifies a Portable Document Format ("PDF") file to replace, such as by referring to the masking attribute selector 208 and/or the data masking processor 206, the network traffic flow multiplexer may refer to the replacement application content database 404 to retrieve a PDF file having characteristic similar to the PDF file to be replaced. Examples of application content characteristics that the network traffic flow multiplexer 406 may compare include the size of the application content to replace, the number of characters in the application content, the electronic format of the application content, or any other application content characteristic. By replacing application content with replacement application content having similar application content characteristics, the network traffic flow multiplexer 406 reconstructs obfuscated network traffic flows and/or obfuscated network messages that appear indistinguishable from real network traffic when the obfuscated network traffic flows and/or obfuscated network messages are replayed, or appear in, a mimicked network while preserving the privacy and security of the original monitored network traffic.

Figure 5:
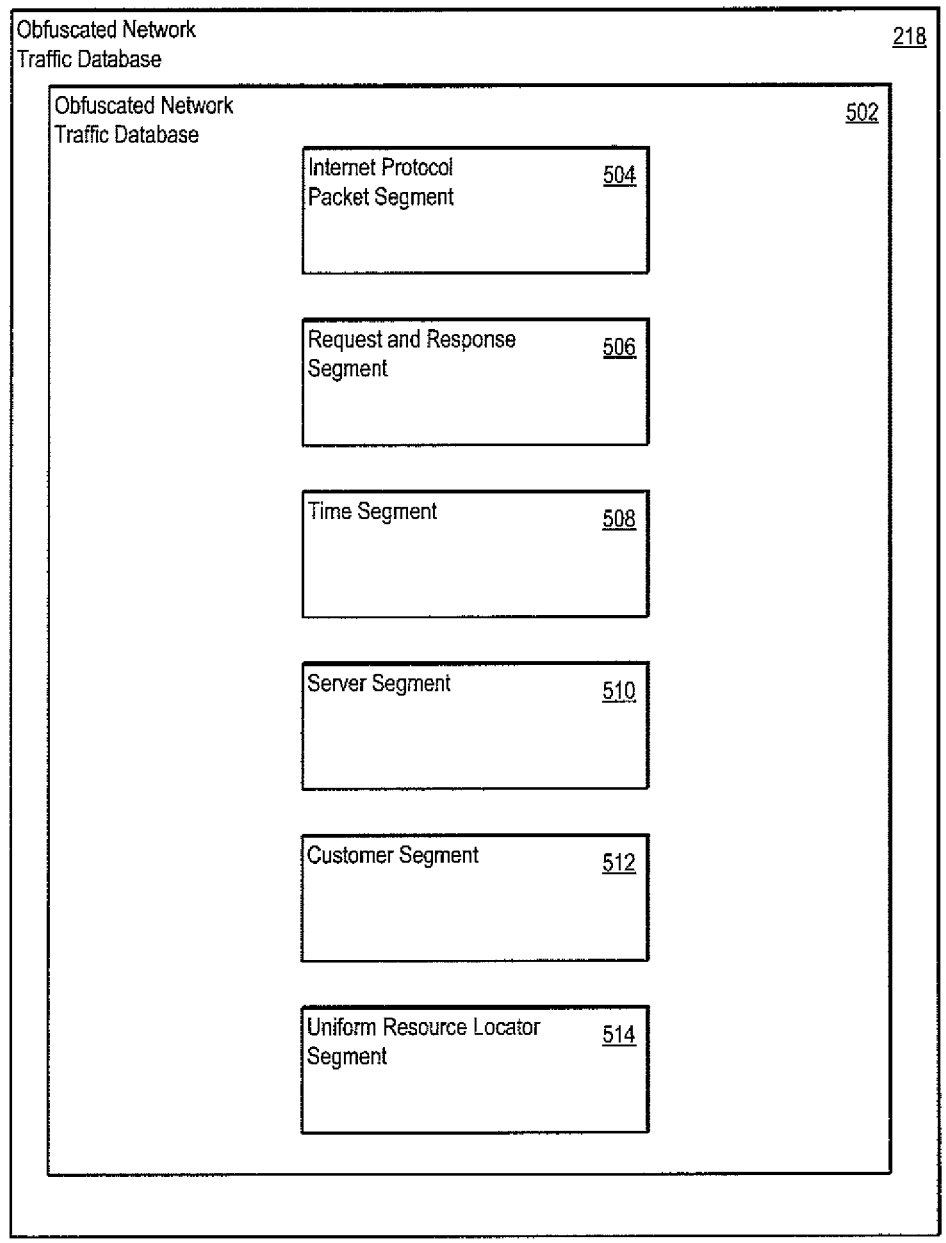
FIG. 5 illustrates an example of a segmentation schema for an obfuscated network traffic database.

FIG. 5 illustrates an example of a segmentation schema 502 for the obfuscated network traffic database 218. In one implementation, the segmentation schema 502 includes an IP packet segment 504, a request and response segment 506, a time segment 508, a server segment 510, a customer segment 512, and a Uniform Resource Locator ("URL") segment 514. The implementation of the segmentation schema 502 is designed to preserve the integrity of an obfuscated network message such that the obfuscated network message appears indistinguishable from an actual network message when the obfuscated network message is replayed in a mimicked network.

Each of the segments 504-514 may include one or more attributes for defining an obfuscated network message. For example, the IP packet segment 504 may specify IP packet attributes for obfuscated network header content. In addition, the request and response segment 506 may specify request and response attributes for obfuscated network header content. Moreover, the time segment 508 may specify time attributes for obfuscated network header content. Furthermore, the server segment 510 may specify server attributes for obfuscated network header content. In addition, the customer segment 512 may specify customer attributes for obfuscated network header content. Yet further, the URL segment 514 may specify URL attributes for obfuscated network header content. In addition, the segments 504-514 may include attributes that may define or specify application content, replacement application content, or a combination thereof.

The segmentation schema 502 is one example of a segmentation schema for obfuscating network traffic. However, a segmentation schema for obfuscating network traffic may be application specific in that, depending on the complexity of the network traffic, the segmentation schema 502 may include more or less attributes for obfuscating the network traffic. For example, in one example where the IP addresses of the network traffic are to be obfuscated, the segmentation schema 502 may include a few attributes such as a source IP address attribute, a destination IP address attribute, a protocol attribute, and/or other attributes. In a more complex scenario, such as where the obfuscated network traffic server 102 may conduct a deep packet inspection of one or more network packets, an alternative or more complex segmentation may be used. With a deep packet inspection, the segmentation schema may include a request attribute for the various types of HTTP commands (GET, HEAD, POST, etc.), a related object Uniform Resource Identifier ("URI") for one or more resources of the network packets, a protocol version attribute, a content type attribute, a host name attribute, a date sent attribute, a referrer attribute, or any number of other types of attributes. In other words, the segmentation schema may vary depending on the level of obfuscation of the network traffic.

Any one of the components of the obfuscated network traffic server 102/302/402 may populate the attributes of the segments 504-514. For example, the network monitor 202 may populate the attributes of the segments 504-514 while the network monitor 202 is monitoring the network traffic flows, before monitoring network traffic flows, or even after monitoring network traffic flows. As another example, the data masking processor 206 and/or the network traffic flow multiplexer 304/406 may populate the attributes of the segments 504-514 while masking the network header content and/or application content, before masking the network header content and/or application content, or even after masking the network header content and/or application content. Other components and other times for populating the attributes the segments 504-514 are also possible.

Figure 6:
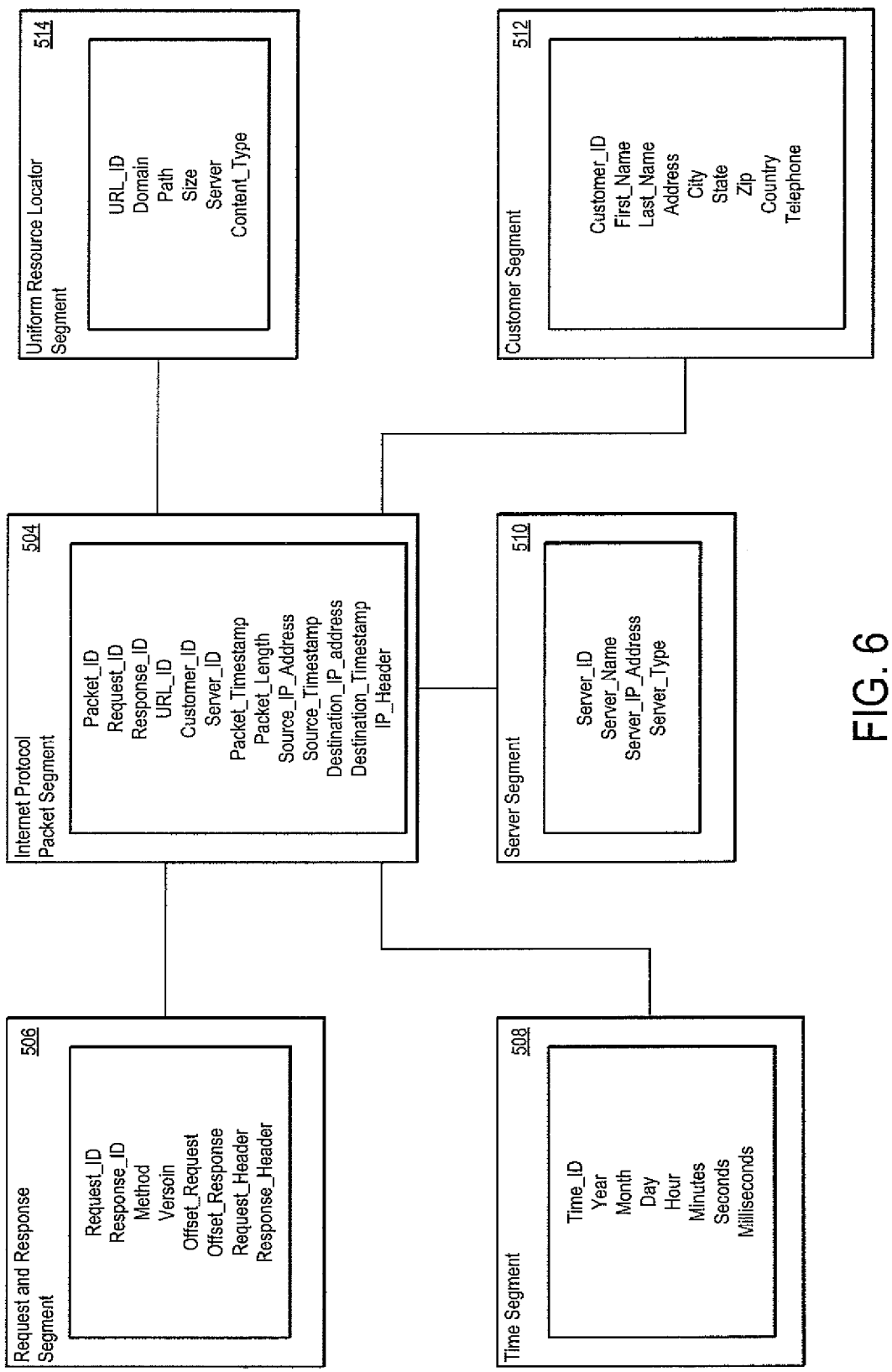
FIG. 6 illustrates exemplary details for the segmentation schema of the obfuscated network traffic database shown in FIG. 5.

FIG. 6 illustrates exemplary details for a segmentation schema 502 of the obfuscated network traffic database shown in FIG. 5. The attributes shown in FIG. 6 are exemplary and should be understood that alternative attributes may be used to define obfuscated network header content and/or application content. As discussed above, depending on the previously collected network traffic, alternative attributes may be used or defined for the segmentation schema 502.

Tables 1-6 below describe the various attributes shown in the exemplary segments 504-514.

TABLE 1

Internet Protocol Packet Segment

| Attribute | Description |
| --- | --- |
| Packet_ID | An identifier of a network packet. |
| Response_ID | A response identifier of a network packet |
| URL_ID | A URL identifier for a URL in a network packet |
| Customer_ID | A customer identifier for a network packet. |
| Server_ID | A server identifier for a network packet. |
| Packet_Timestamp | A timestamp for a network packet. |
| Packet_Length | A packet length for a network packet. |
| Source_IP_Address | A source IP address for a network packet. |
| Source_Timestamp | A source timestamp for a network packet. |
| Destination_IP_Address | A destination IP address for a network packet. |
| Destination_Timestamp | A destination timestamp for a network packet. |
| IP_Header | An IP header for a network packet. |

TABLE 2

Request and Response Segment

| Attribute | Description |
| --- | --- |
| Request_ID | A request identifier for a network packet. |
| Response_ID | A response identifier for a network packet. |
| Method | A method descriptor for a network packet. |
| Version | A version identifier for a network packet. |
| Offset_Request | An offset descriptor for a request network packet. |
| Offset_Response | An offset descriptor for a response network packet. |
| Request_Header | A request header descriptor for a request network packet. |
| Response_Header | A response header descriptor for a response header network packet. |

TABLE 3

Time Segment

| Attribute | Description |
| --- | --- |
| Time_ID | A time identifier for a network packet. |
| Year | A year descriptor for a network packet. |
| Month | A month descriptor for a network packet. |
| Day | A day descriptor for a network packet. |
| Hour | An hour descriptor for a network packet. |
| Minutes | A minute descriptor for a network packet. |
| Seconds | A seconds descriptor for a network packet. |

TABLE 3-continued

Time Segment

| Attribute | Description |
| --- | --- |
| Milliseconds | A milliseconds descriptor for a network packet. |

TABLE 4

Server Segment

| Attribute | Description |
| --- | --- |
| Server_ID | A server identifier for a network packet. |
| Server_Name | A server name descriptor for a network packet. |
| Server_IP_Address | A server IP address descriptor for a network packet. |
| Server_Type | A server type descriptor for a network packet. |

TABLE 5

Customer Segment

| Attribute | Description |
| --- | --- |
| Customer_ID | A customer identifier for a network packet. |
| First_Name | A first name descriptor of a customer for a network packet. |
| Last_Name | A last name descriptor of a customer for a network packet. |
| Address | An address descriptor of a customer for a network packet. |
| City | A city descriptor of a customer for a network packet. |
| State | A state descriptor of a customer for a network packet. |
| Zip | A zip code descriptor of a customer for a network packet. |
| Country | A country descriptor of a customer for a network packet. |
| Telephone | A telephone descriptor of a customer for a network packet. |

TABLE 6

Uniform Resource Locator Segment

| Attribute | Description |
| --- | --- |
| URL_ID | A URL identifier for a network packet. |
| Domain | A network domain descriptor for a network packet. |
| Path | A network path descriptor for a network packet. |
| Size | A size descriptor for a network packet. |
| Server | A server descriptor for a network packet. |
| Content_Type | A content type descriptor for a network packet. |

Figure 7:
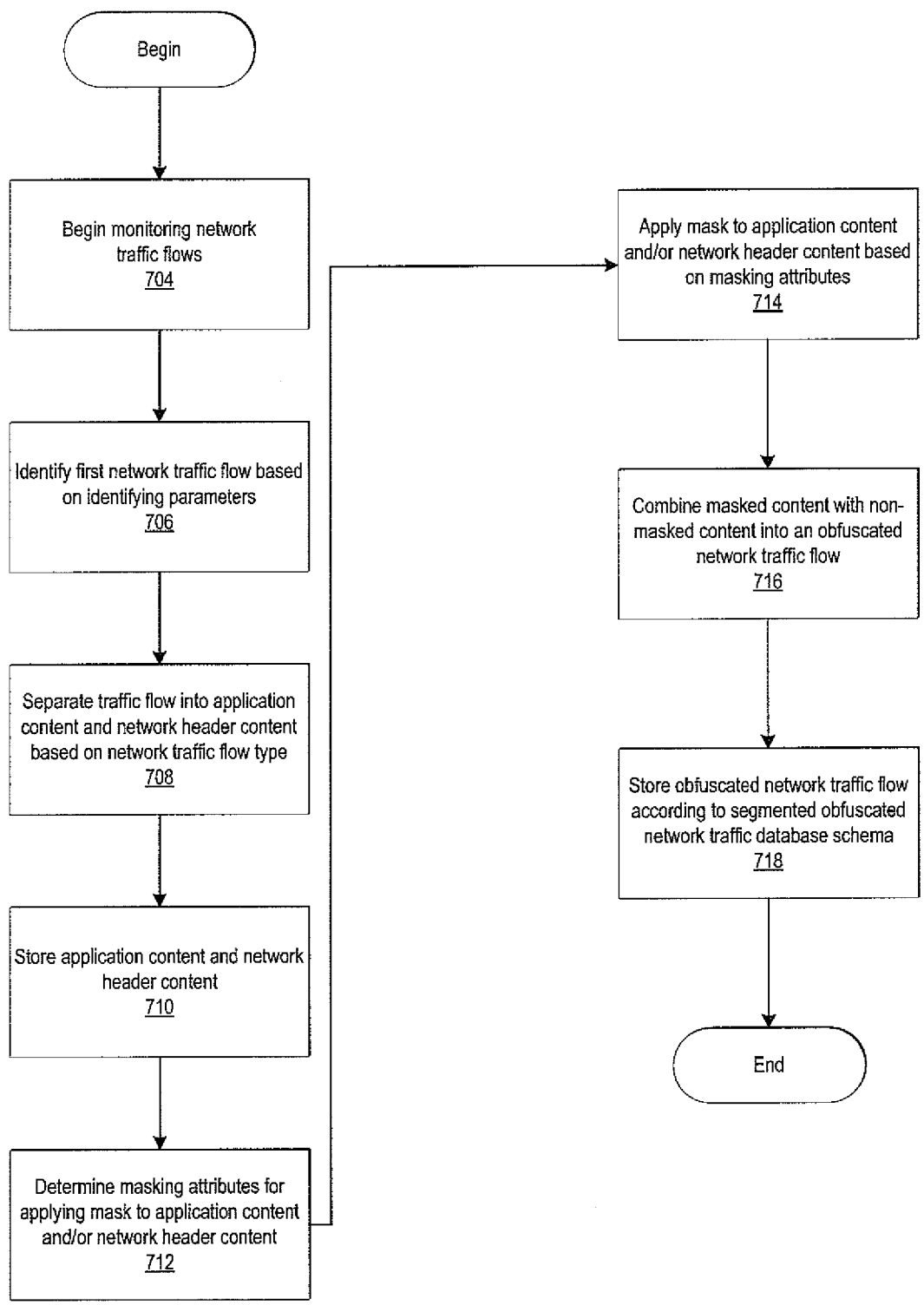
FIG. 7 illustrates one example of logic flow for an exemplary obfuscated network traffic server.

FIG. 7 illustrates one example of logic flow 702 for an exemplary obfuscated network traffic server 102/302/402. Initially, the network traffic monitor 202 begins monitoring one or more network traffic flows (Block 704). The network traffic monitor 202 may then identify one or more network traffic flows based on network traffic flow identifying parameters (Block 706). As previously discussed, the network model 212 may specify the types of network traffic flows to monitor or how the network traffic monitor 202 is to monitor one or more network traffic flows.

When the network traffic monitor 202 has identified a specified network traffic flow, the network traffic monitor 202 may then separate the network traffic flow into application and network header content (Block 708). As previously discussed, the network monitor 202 may separate the application content and the network header content based on the network traffic type of the network traffic flow. The network monitor 202 may then store the extracted application content and network header content into one or more databases, such as the application content database 214, the network header database 216, or other database (Block 710).

To obfuscate the application content and/or network header content, the masking attribute selector 208 may receive or determine one or more masking attributes for determining how to mask the application content and/or network content. As previously discussed and in summary, masking may include bitwise operations, replacing content with content stored in another database, or replacing content with randomly generated or pseudo-randomly generated content (Block 712).

The data masking processor 206 and/or the network traffic flow multiplexer 304/406 may apply a mask to the application content and/or the network header content based on the masking attributes from the masking attribute selector 208 (Block 714). In one implementation of the obfuscated network traffic server 302/402, the network traffic flow multiplexer 304/406 combines the obfuscated network header content with application content (Block 716). The data masking processor 206 and/or the network traffic flow multiplexer 304/406 may then store the masked application content and/or masked network header content in the obfuscated network traffic database 218 (Block 718). As discussed above, different implementations of the obfuscated network traffic server 102/302/402 may treat the obfuscated network header content and/or the obfuscated application content differently depending on its implementation.

The systems, components, and logic described above may be implemented in many different ways, including a combination of hardware and software, or as software for installation on any desired operating system including Linux, UNIX, or Windows. The functionality may be implemented in a single system or functionally partitioned across multiple systems. As another example, the components, systems, and logic may be implemented as computer-executable instructions or as data structures in memory and may be stored on, distributed across, or read from many different types of machine-readable media or computer-readable storage devices. The machine-readable media or computer-readable storage devices may include RAM, ROM, hard disks, floppy disks, CD-ROMs, flash memory or other machine-readable medium. The components, systems and logic may also be encoded in a signal, such as a signal received from a network or partitioned into sections and received in multiple packets communicated across a network.

The systems may be implemented in software, hardware, or a combination of software and hardware. The systems may be implemented in a computer programming language, such as C# or Java, or any other computer programming language now known or later developed.

Furthermore, the systems may be implemented with additional, different, or fewer components. As one example, a processor or any other logic or component may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems.

Logic, such as programs or circuitry, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system.

Moreover, one or more networks may be implemented as any combination of networks. A network may be a Wide Area Network ("WAN"), such as the Internet; a Local Area Network ("LAN"); a Personal Area Network ("PAN"), or a combination of WANs, LANs, and PANs. Moreover, a network may involve the use of one or more wired protocols, such as SOAP; wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of network protocol now known or later developed.

Interfaces between the systems and the logic and modules within systems may be implemented in numerous ways. For example, interfaces between systems may be Web Services, Simple Object Access Protocol, or Enterprise Service Bus interfaces. Other examples of interfaces include message passing, such as publish/subscribe messaging, shared memory, and remote procedure calls.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims. Furthermore, while certain operations and functions are shown in a specific order, they may be performed in a different order unless it is expressly stated otherwise.

We claim:

1. A system for generating obfuscated network traffic, the system comprising:
a network monitor for separating a first network traffic flow into application content and network header content based on a first network model by separately extracting the application content and network header content in accordance with the first network model;
a computer-readable storage device comprising:
an application content database operative to store application content extracted from the first network traffic flow by the network monitor;
a network header content database operative to store network header content extracted from the first network traffic flow by the network monitor; and
an obfuscated network traffic database operative to store obfuscated network header content;
a masking attribute selector operative to receive an input specifying one or more network header attributes to be masked;
a data masking processor operative to:
retrieve the network header content stored in the network header content database; and
mask at least a selected portion of the network header content to generate the obfuscated network header content, wherein the data masking processor is further operative to mask the selected portion of the network header based on the input received by the masking attribute selector; and
an obfuscated network traffic request interface operative to:
receive a request for obfuscated network traffic; and
transmit the obfuscated network header content stored in the obfuscated network traffic database based upon the request for obfuscated network traffic;
where said mask is at least one of: a bitwise operation, analyzing the IP addresses in the network header content and changing or replacing the IP addresses with a set of IP addresses, replacing one or more network priority bits of the network header content with a different but consistent set of network priority bits, replacing one or more portions of the network header content requested from the network header content database, replacing content with content stored in another database, and replacing content with randomly generated content or pseudo-randomly generated content.

2. The system of claim 1, further comprising a replacement application content database operative to store replacement application content, wherein:
at least a portion of the application content extracted by the network monitor is replaced with the replacement application content stored in the replacement application content database.

3. The system of claim 1, wherein:
the application content is identified as being sensitive application content not intended to be viewed by a recipient other than the recipient identified in the network header content; and
the application content is replaced with replacement application content having similar characteristics as the identified application content.

4. The system of claim 1, wherein:
the first network traffic flow is a first type of network traffic flow;
the application content database is further operative to store application content extracted from a second network traffic flow;
the network header content database is further operative to store network header content extracted from the second network traffic flow; and
the second network traffic flow is a second type of network traffic flow different from the first type of network flow, wherein the network monitor separates the second network traffic flow into application content and network header content based on a second network model.

5. The system of claim 4, wherein:
the first type of network traffic flow comprises the File Transfer Protocol ("FTP"); and
the second type of network traffic flow comprises the Hypertext Transfer Protocol ("HTTP").

6. The system of claim 1, wherein:
the first network flow is identified based on a destination port specified in the network header content.

7. The system of claim 1, further comprising:
a network traffic flow multiplexer operative to:
receive obfuscated network header content from the data masking processor;

request application content from the application content database based on an application content identifier;

reconstruct an obfuscated network traffic flow comprising the requested obfuscated network header content and the requested application content; and store the obfuscated network traffic flow in the obfuscated network traffic database.

8. The system of claim 7, wherein the network traffic flow multiplexer is further operative to:

replace the requested obfuscated network traffic header content stored in the obfuscated network traffic database with the reconstructed obfuscated network traffic flow.

9. The system of claim 1, wherein the obfuscated network traffic database is segmented according to an obfuscated network traffic database schema, the obfuscated network traffic database schema comprising:

an Internet Protocol ("IP") packet segment specifying IP packet attributes for the obfuscated network header content;

a request and response segment specifying request and response attributes for the obfuscated network header content;

a time segment specifying time attributes for the obfuscated network header content;

a server segment specifying server attributes for the obfuscated network header content;

a customer segment specifying customer attributes for the obfuscated network header content; and a Uniform Resource Locator ("URL") segment specifying URL attributes for the obfuscated network header content.

10. A method for generating masked network traffic, the method comprising:

receiving extracted application content of a first network traffic flow and extracted network header content of the first network traffic flow;

receiving, with a masking attribute selector, an input specifying one or more network header attributes to be masked;

masking, with a data masking processor, at least a selected portion of the network header content to generate masked network header content, wherein the masking of the selected portion of the network header by the data masking processor is based on the input received by the masking attribute selector;

combining the masked network header content with the separated application content based on a maintained relationship between the application content and the network header content; and transmitting the combined masked network header content and application content in response to a request for masked network traffic;

where said masking comprises at least one of: a bitwise operation, analyzing the IP addresses in the network header content and changing or replacing the IP addresses with a set of IP addresses, replacing one or more network priority bits of the network header content with a different but consistent set of network priority bits, replacing one or more portions of the network header content requested from the network header content database, replacing content with content stored in another database, and replacing content with randomly generated content or pseudo-randomly generated content.

11. The method of claim 10, further comprising:

storing replacement application content in a computer-readable storage device; and replacing at least a portion of the application content separated from the network header content with the replacement application content stored in the computer-readable storage device.

12. The method of claim 10, further comprising:

identifying the application content as being sensitive application content not intended to be viewed by a recipient other than the recipient identified in the network header content; and replacing the sensitive application content with replacement application content having similar characteristics as the identified sensitive application content.

13. The method of claim 10, wherein the first network traffic flow is a first type of network traffic flow, and further comprising:

receiving extracted application content of a second network traffic flow and extracted network header content of the second network traffic flow, wherein:

the second network traffic flow is a second type of network traffic flow different from the first type of network flow.

14. The method of claim 13, wherein:

the first type of network traffic flow comprises the File Transfer Protocol ("FTP"); and the second type of network traffic flow comprises the Hypertext Transfer Protocol ("HTTP").

15. The method of claim 10, wherein:

the first network flow is identified based on a destination port specified in the network header content.

16. The method of claim 10, wherein:

the application content and the network header content are separated based on a network traffic type of the first network traffic flow.

17. The method of claim 10, further comprising:

masking, with the data masking processor, the application content of the first network traffic flow based on at least one first masking attribute.

18. The method of claim 17, wherein:

the network header content of the first network traffic flow is first network header content;

the application content of the first network traffic flow is first application content;

the masked application of the first network traffic flow is first masked application content; and, further comprising:

receiving second network header content and second application content extracted from a second network traffic flow; and masking, with the data masking processor, the second application content based on at least one second masking attribute; wherein:

the at least one first masking attribute and the at least one second masking attribute are different.

19. The method of claim 10, further comprising:

establishing a masked network traffic database operative to store the masked network header content;

segmenting the masked network traffic database according to a masked network traffic database schema, wherein maintaining the relationship between the separated application content and separated network header content is based on the masked network traffic database schema; and storing the masked network header content in the masked network traffic database according to the masked network traffic database schema.

20. The method of claim 19, wherein the masked network traffic database schema comprises:

an Internet Protocol ("IP") packet segment specifying IP packet attributes for the masked network header content;
a request and response segment specifying request and response attributes for the masked network header content;
a time segment specifying time attributes for the masked network header content;
a server segment specifying server attributes for the masked network header content;
a customer segment specifying customer attributes for the masked network header content; and
a Uniform Resource Locator ("URL") segment specifying URL masked for the obfuscated network header content.

* * * * *